United States Patent
Kirchner et al.

(10) Patent No.: US 8,844,143 B2
(45) Date of Patent: Sep. 30, 2014

(54) METHOD FOR PRODUCING A ROTOR OF A COMMUTATOR MOTOR, A COMMUTATOR MOTOR, AND ANTI-LOCK BRAKING DEVICE

(75) Inventors: Heinrich Kirchner, Kuernach (DE); Robert Hessdoerfer, Karlstadt (DE)

(73) Assignee: Brose Fahrzeugteile GmbH & Co. Kom manditgesellschaft, Wurzburg, Wurzburg (DE)

( * ) Notice: Subject to any disclaimer, the term of this patent is extended or adjusted under 35 U.S.C. 154(b) by 861 days.

(21) Appl. No.: 13/120,334

(22) PCT Filed: Sep. 14, 2009

(86) PCT No.: PCT/DE2009/001274
§ 371 (c)(1),
(2), (4) Date: Jun. 6, 2011

(87) PCT Pub. No.: WO2010/031381
PCT Pub. Date: Mar. 25, 2010

(65) Prior Publication Data
US 2011/0241475 A1    Oct. 6, 2011

(30) Foreign Application Priority Data

Sep. 22, 2008  (DE) .......................... 10 2008 042 242

(51) Int. Cl.
*H01R 39/32*   (2006.01)

(52) U.S. Cl.
USPC .......................................... 30/234

(58) Field of Classification Search
USPC .......................... 310/234, 233, 179, 235, 236
See application file for complete search history.

(56) References Cited

U.S. PATENT DOCUMENTS

| | | | |
|---|---|---|---|
| 6,218,755 B1 | 4/2001 | Tanaka et al. | |
| 8,604,662 B2 * | 12/2013 | Ishikawa et al. | 310/239 |
| 2009/0146526 A1 * | 6/2009 | Aoyama et al. | 310/234 |

FOREIGN PATENT DOCUMENTS

| | | |
|---|---|---|
| EP | 1 073 182 A2 | 1/2001 |
| EP | 1 489 724 A1 | 12/2004 |
| JP | 60 062842 A | 4/1985 |
| JP | 2002 374645 A | 12/2002 |

* cited by examiner

*Primary Examiner* — Hanh Nguyen
(74) *Attorney, Agent, or Firm* — Erik G. Swenson; Fulbright & Jaworski L.L.P.

(57) ABSTRACT

The present invention relates to a method for producing a rotor of a commutator motor, particularly in a direct current design, comprising a stator having a plurality of stator poles, wherein the rotor comprises a plurality of armature teeth which are disposed on the circumference of the rotor having interposed rotor grooves, and a commutated, which has a plurality of disks and associated winding hooks, comprising the following steps: winding bridges of the commutated by connecting winding hooks of the disks of the commutated, winding windings of armature teeth, and connecting the respective winding ends to winding hooks of the disks of the commutator. The invention further relates to such a commutated motor, particularly in a direct current design, and to an anti-lock breaking device.

20 Claims, 4 Drawing Sheets

METHOD FOR PRODUCING A ROTOR OF A COMMUTATOR MOTOR, A COMMUTATOR MOTOR, AND ANTI-LOCK BRAKING DEVICE

FIELD OF THE INVENTION

The present invention relates to a method for producing a rotor, comprising a commutator, of a commutator motor. The present invention further relates to a commutator motor, in particular in a direct current configuration, and to an anti-lock braking device.

BACKGROUND OF THE INVENTION

Commutator motors of this type are generally known and are used, for example, in drive means of motor vehicles, for example in servo drives and the like.

In a commutator motor internally known to the applicant comprising twenty-four plates, a single-tooth winding is provided for which a needle winding device is to be used, since said needle winding device exhibits shorter cycle times than a flyer winder when connecting wires to laminated hooks. In this context, a winding diagram provides bridges on the commutator. The winding must therefore be carried out in one cycle and this is done using a "needle winder". A problem with this is that, in the case of a single-wire winding, three or four wires are to be connected to a respective laminated hook using this winding diagram. This laminated hook must therefore be correspondingly large, and this increases the installation space of the commutator and thus of the entire commutator motor.

The increased requirements on the conditions of use in a motor vehicle, in particular as regards a minimal constructional volume, weight, and number of individual parts used and a simultaneous high efficiency, result in a constant requirement to provide a correspondingly improved commutator motor.

Against this background, the object of the present invention is therefore to provide an improved commutator motor.

SUMMARY OF THE INVENTION

This object is achieved according to the invention by a commutator motor having the features of claim 1 and/or by a method having the features of claim 6 and/or by an anti-lock braking device having the features of claim 13.

Accordingly, a method is provided for producing a rotor, comprising a commutator, of a commutator motor, in particular in a direct current configuration, comprising a stator which has a plurality of stator poles, the rotor comprising a plurality of armature teeth, which are arranged on the circumference of the rotor with interposed rotor grooves, and a commutator which has a plurality of plates and associated laminated hooks. The method comprises the following steps: winding bridges on a bridge side of the commutator by connecting bridge hooks of plates of the commutator; and winding armature teeth windings and connecting the respective winding ends to armature hooks of the plates on an armature side of the commutator.

A commutator motor, in particular in a direct current configuration, is also provided, comprising a stator which has a plurality of stator poles, comprising a rotor which has a plurality of armature teeth which are arranged on the circumference of the rotor with interposed rotor grooves, a winding, in particular a single-tooth winding, being provided on each armature tooth, comprising a commutator which comprises a plurality of plates and associated laminated hooks, the windings being connected to winding hooks of plates of the commutator, a number of plates being interconnected in each case by bridges between winding hooks of the plates on the armature side of the commutator, and the rotor being produced according to the above-described method.

By using a commutator motor of this type comprising a commutator having winding hooks, it is now possible, via shorter single hooks, to reduce the weight (in particular the copper material required in this case) and the installation space of the commutator and thus of the commutator motor by comparison with previous solutions, it being possible at the same time to maintain the required power and rotational speed. A lower number of wires between the laminated or commutator hooks results in a partial price reduction, because it means that the commutator is also shorter.

A further advantage is that it is now possible to use double flyer winding devices, half of the windings being formed from a continuous winding wire in each case. This results in minimised cycle times because the process of forming the connections to the laminated hooks is optimised in terms of the time requirement and winding effort. The bridges can be wound independently of the cycle time at a separate station. However, it is also possible for the commutator to be wound by a supplier, for example, and to perform the windings of the armature itself after assembly of the commutator. However, the bridges can also be wound on the production line.

Winding using "flyer winders" also has the advantage that existing winding devices can easily be adapted.

The described commutator motor is preferably adapted for the drive means of a motor vehicle anti-lock braking device. However, other applications in other drive means are also conceivable.

Advantageous configurations and developments of the invention are apparent from the dependent claims and from the description in conjunction with the figures of the drawings.

In a preferred configuration, at least two plates in each case are interconnected via a bridge.

Half of the windings in each case are preferably formed from a continuous winding wire. In this case, for example at least two of the windings are wound in the opposite direction from the remaining windings.

The stator poles of the commutator motor are preferably formed as permanent magnets, although other excitation pole technologies can also be used, for example appropriate coils.

In a preferred configuration of the method according to the invention, the windings are wound after the wound commutator has been assembled. In this case, the bridges of the commutator are preferably wound at a separate location. Alternatively, it would also be conceivable for the bridges and the windings to be wound on a production line. In this case, the bridges and the windings are wound, for example, when the commutator is assembled but not wound. Alternatively, they are wound on a separate machine on the production line. This advantageously results in a significant saving in time for the entire winding process.

The bridges are preferably wound without intermediate cutting of the winding wire, i.e. in a single, continuous process step. Predetermined points of the wire are preferably cut after completion of the wound bridges.

In one configuration of the method according to the invention, the start and end of the wire of a respective winding are connected to different commutator hooks when the windings are wound.

The bridges and windings are preferably wound by means of a "flyer". It is particularly preferred for the windings to be wound using a "double flyer". These flyers or double flyers are mechanical means which are known from textile technology and are adapted to set a corresponding movement, direction and rotation. Flyers of this type are also referred to as flyer spinning frames.

The windings are preferably single-tooth windings.

In an alternative configuration, the commutator has bridge hooks and winding hooks which, for example, are located opposite one another. In this case, the bridges are wound on a bridge side of the commutator by connecting bridge hooks of the plates of the commutator, and the armature teeth windings are wound and the respective winding ends connected to winding hooks of the plates on an armature side, opposite the bridge side, of the commutator.

A corresponding commutator motor comprises a commutator of this type comprising a plurality of plates and associated bridge hooks and winding hooks. In this case, the windings are connected to winding hooks of the plates on an armature side of the commutator, a number of plates being interconnected in each case via bridges between bridge hooks of the plates on a bridge side, opposite the armature side, of the commutator, and the rotor being produced according to the above-described alternative method.

The above-described configurations and developments of the invention can be combined in any desired manner.

BRIEF DESCRIPTION OF THE DRAWINGS

The present invention is described in greater detail in the following by way of the embodiments illustrated in the schematic figures of the drawings, in which.

In the figures of the drawings, like and functionally equivalent elements and features are provided with like reference numerals unless indicated otherwise.

DESCRIPTION OF EMBODIMENTS OF THE INVENTION

Figure 1:
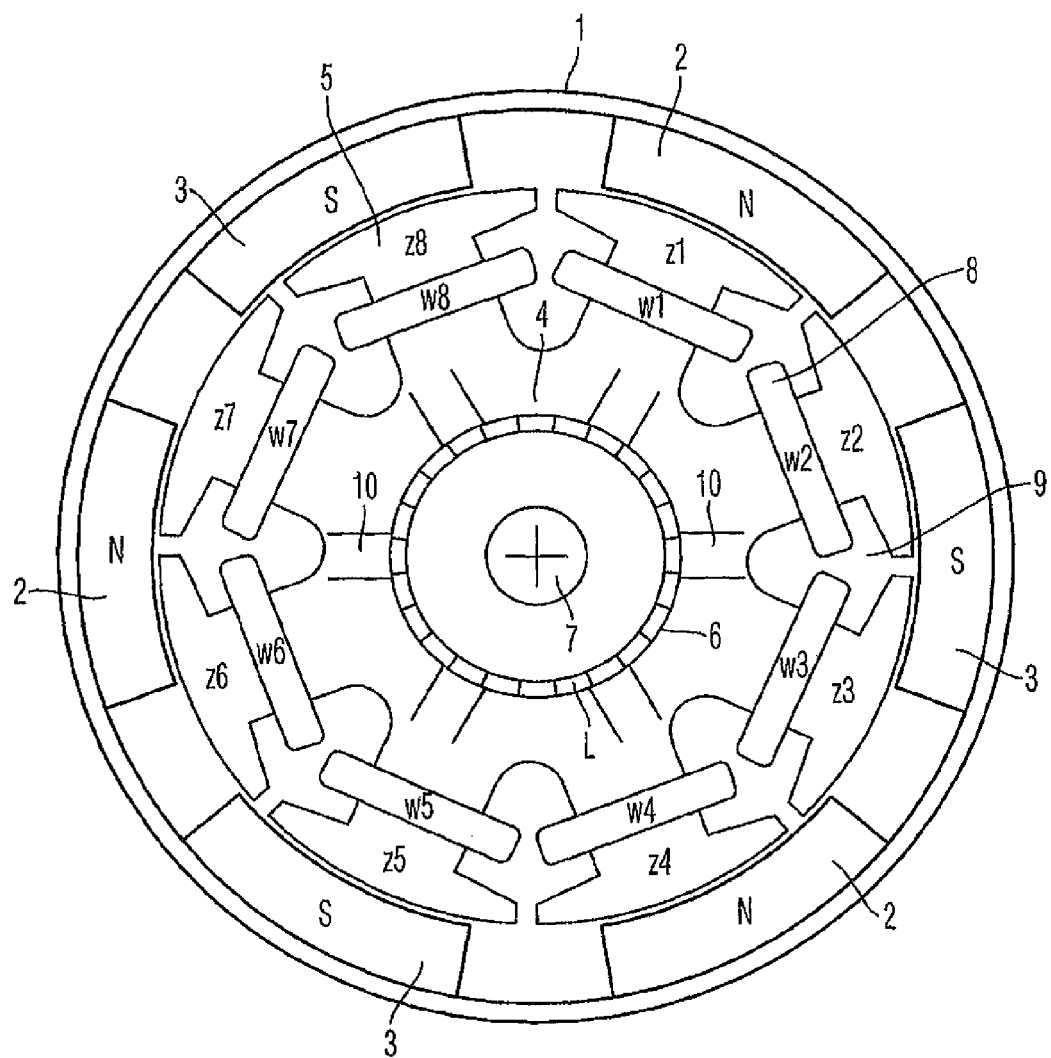
FIG. 1 is a schematic plan view of a preferred embodiment of a commutator motor according to the invention.

The basic construction of a commutator motor according to the invention will be described below with reference to FIG. 1. FIG. 1 is a schematic plan view of a commutator motor of this type. In a stator denoted by reference numeral 1, stator poles 2, 3 (in this case in the form of permanent magnets with north and south poles N, S) are arranged around a rotor 4. The rotor 4 is rotationally engaged on an armature shaft 7 and has a plurality of armature teeth 5 which are spaced apart from one another by rotor grooves 9. Windings 8 are provided around the armature teeth 5 and in the rotor grooves 9, the ends of which windings are connected to plates L via winding hooks 14 (see FIG. 4) of a commutator 6. Two or more brushes 10 are provided to supply the commutator 6 with current.

This commutator motor, for example in a direct current configuration, may be formed in particular for use in an anti-lock braking device of a motor vehicle which requires precise rotational speed detection. For example, an idle rotational speed of this commutator motor is around 4500 min$^{-1}$.

In this preferred embodiment, the commutator motor comprises a stator 1 having six poles 2, 3, preferably permanent magnets N, S. The rotor 4 has eight armature teeth 5, each having a winding 8, in particular a single-tooth winding. The commutator 6 comprises twenty-four plates L1 . . . L24.

In this case, the number (twenty-four) of the plates L is a multiple of the number of pairs (three) of stator poles 2, 3 and also a multiple of the number of stator poles 2, 3 (six). The number twenty-four is also a multiple of the number of armature teeth 5 (eight). These numbers are given only by way of example; other configurations can obviously also be used.

The armature teeth 5 are each denoted by reference numerals z1 . . . z8 and the associated windings are each denoted by reference numerals w1 . . . w8.

Figure 2:
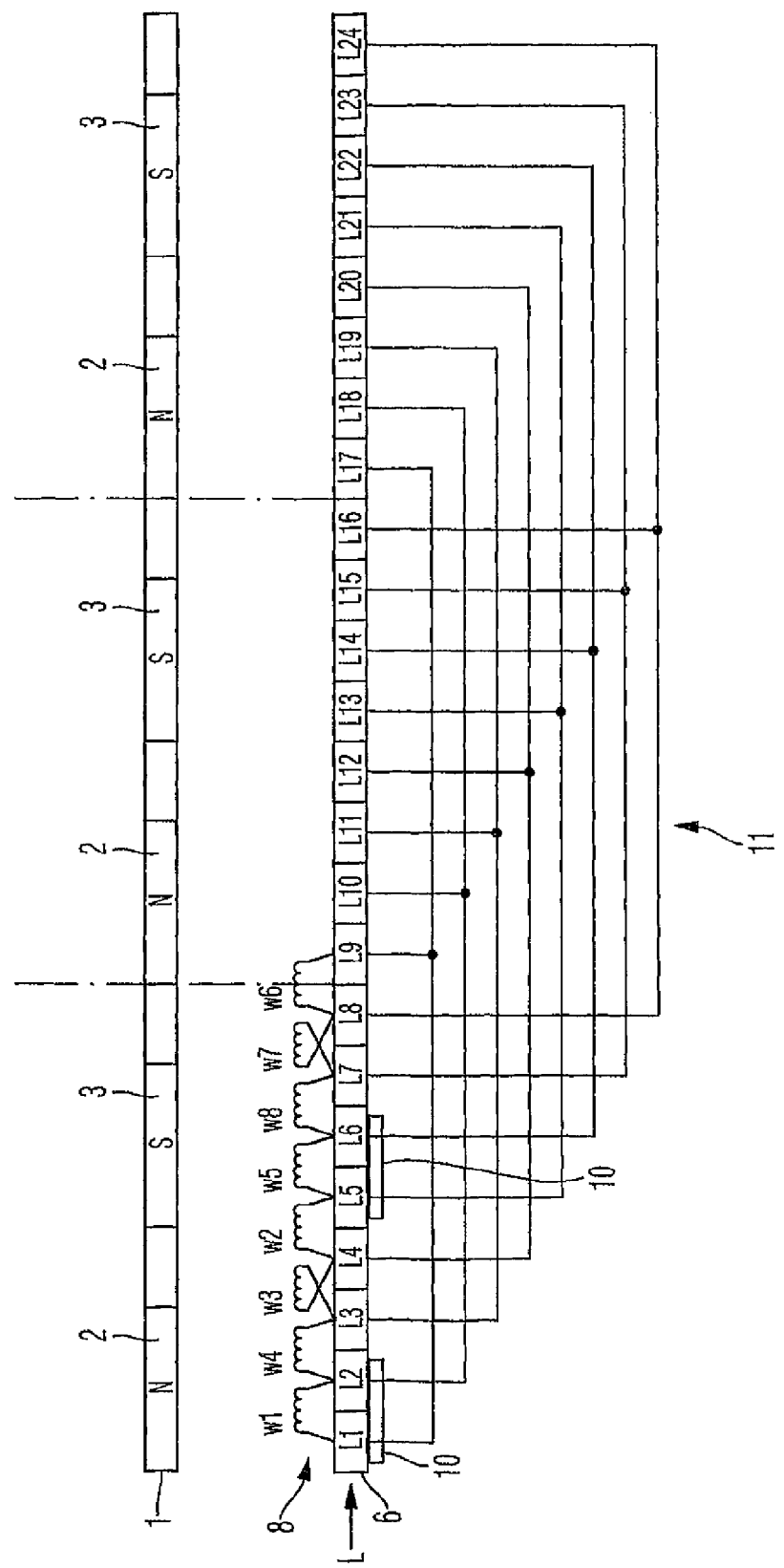
FIG. 2 is a preferred winding diagram for the commutator motor according to the invention shown in FIG. 1.

FIG. 2 is a preferred winding diagram for the commutator motor according to the invention shown in FIG. 2 with the ends of the windings 8 being connected to the plates L. In FIG. 2, stators 1 comprising the stator poles 2, 3 and the plates L are shown unwound. In this case, the individual plates are provided with reference numerals L1 . . . L4. The two brushes 10 are shown schematically.

The first end of winding w1 is connected to plate L1, the second end of winding w1 being connected to plate L2. The first end of winding w4 is connected to plate 2, the second end of winding w4 and the second end of winding w3 being located on plate L3. The first end of winding w3 and the first end of winding w2 are connected to plate L4. The other end of winding w2 and the first end of winding w5 are connected to plate L5, the second end of winding w5 and the first end of winding w8 being located on plate L6. The second end of winding w8 and the second end of winding w7 are connected to plate L7. The first end of winding w8 and the first end of winding w6 are connected to plate L8. Finally, the second end of winding w6 is connected to plate L9.

Windings w3 and w7 are wound in the opposite direction from the remaining windings w1 . . . w2, w4 . . . w6 and w8.

In the example shown in FIG. 2, three plates are interconnected in each case via respective bridges 11. The following plate groups, each containing three plates, are interconnected:

L1-L9-L17;
L2-L10-L18;
L3-L11-L19;
L4-L12-L20;
L5-L13-L21;
L6-L14-L22;
L7-L15-L23;
L8-L16-L24.

Figure 3:
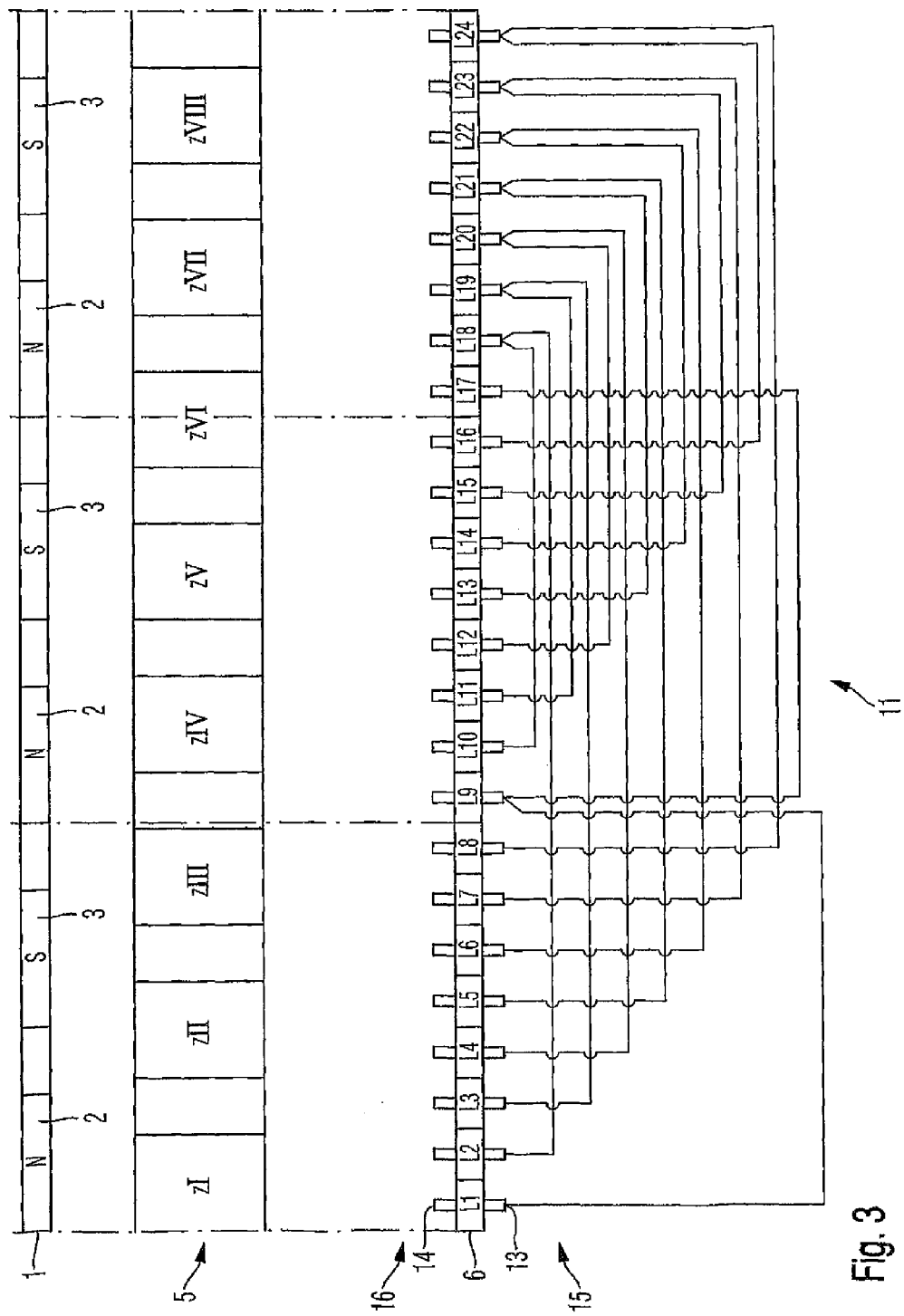
FIG. 3 shows the winding diagram from FIG. 2 for a commutator in a configuration for a mechanical winding method.
Figure 4:
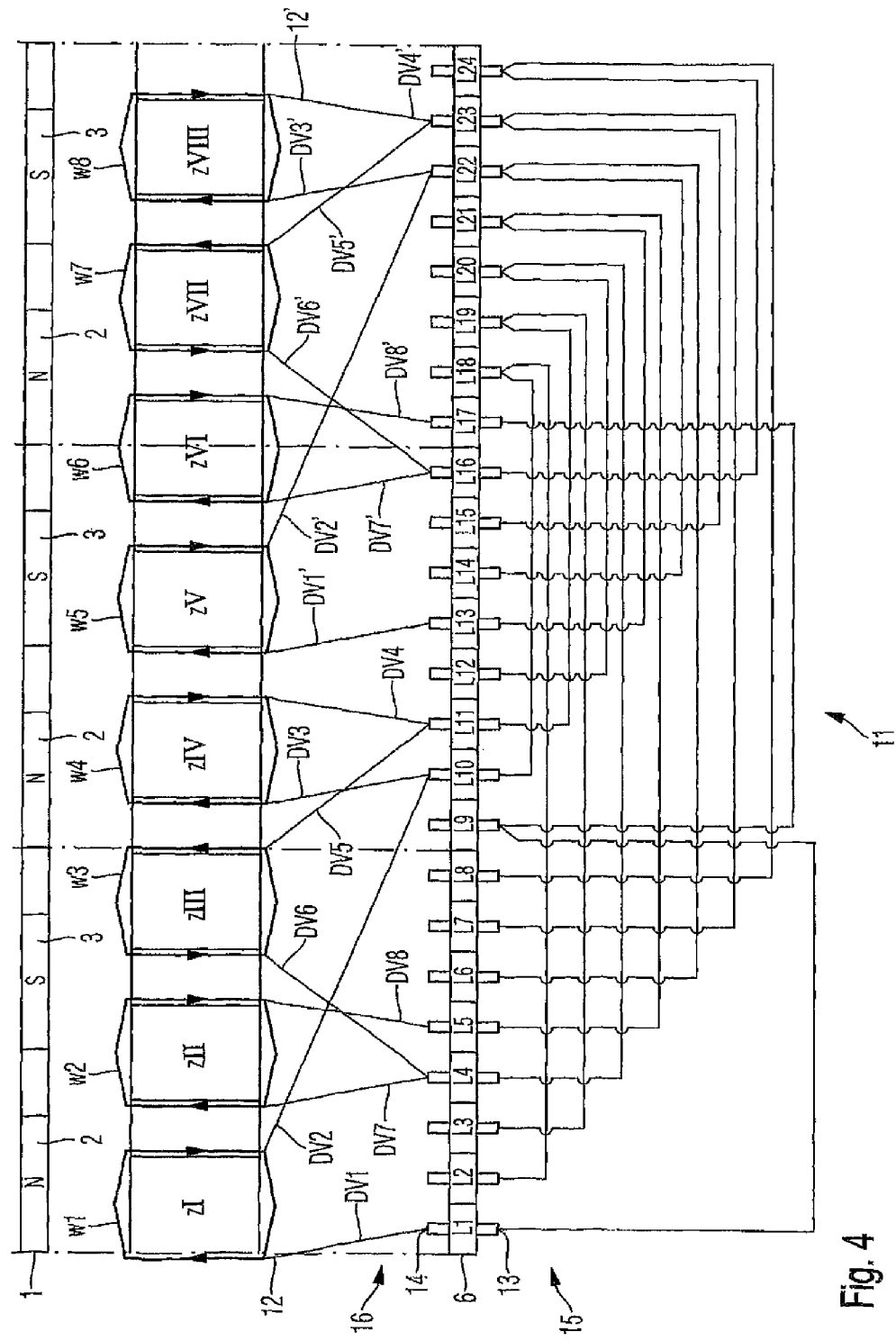
FIG. 4 shows the winding diagram from FIGS. 2 and 3 in a configuration for a mechanical winding method.

The winding diagram of FIG. 2 is illustrated in FIGS. 3 and 4 in a configuration for mechanical windings. In this case, the armature teeth 5 having reference numerals z1 . . . z8 and the windings 8 having reference numerals w1 . . . w8 are shown together.

For producing the windings 8 of the rotor 4 and the bridges 11 of the commutator 6, a method according to the invention is provided in which the commutator 6 is initially wound using the bridges 11. These bridges are wound (see FIGS. 3 and 4) with the bridges 11 being produced as connections between winding hooks 14, which are provided in the form of bridge hooks 13 of the plates L. In one configuration, the bridge hooks 13 are provided with winding hooks 14 (see FIG. 4) for connecting the windings w1 to w8 of the armature teeth 5 (see FIGS. 3 and 4). The windings w1 to w8 are produced separately from the bridges 11 in a further method step.

First, FIG. 3 illustrates firstly the winding diagram from FIG. 2 for the commutator 6 in a configuration for a mechanical winding method. In the diagram shown in FIG. 2, the bridges 11 are produced by connecting the respective bridge hooks 13.

In an alternative configuration, it is also possible for the commutator 6 to be formed with plates L with opposing laminated hooks, namely bridge hooks 13 on a bridge side 15 remote from the armature teeth 5 and winding hooks 14 on an armature side 16 facing the armature teeth 5. This configuration can also be derived from FIGS. 3 and 4 if the diagrams are understood to show the wiring not only on the armature side 16 but on two opposing sides.

A flyer winder, for example, is used when winding the bridges 11, and winds the bridges in one go without intermediate cutting. Predetermined points of the wire are subsequently cut. This separate winding means that the commutator 6 can be prefabricated in this way by the supplier. It is also possible for the commutator to be produced on a separate winder on the production line. However, it is also possible to wind an already assembled commutator 6 on the armature shaft 7 as a first method step, after which windings w1 to w8 are wound. In any case, it is important for the bridges 11 and the windings w1 to w8 to be wound separately in each case.

FIG. 4 shows the winding diagram from FIGS. 2 and 3 in a configuration for a mechanical winding method.

Once the prefabricated commutator 6 comprising the bridge windings 11 has been fastened to the armature shaft 7, windings w1 to w8 are wound in the rotor 4 so as to be orientated towards the commutator 6, in such a way that a maximum of two wires are arranged under a hook 13, 14 in a single-wire winding including bridge winding. This is possible because the start and end of a wire do not come together in one hook but instead are distributed over two hooks and connected via the associated bridges. For example, in the case of winding w1, the start of the wire is located on winding hook 14 of plate L1 and the end of the wire is located on winding hook 14 of plate L10, the associated bridges L1-L9-L17 and L10-L18-L2 being arranged with the start of their respective wires located on L1 and L10 respectively, a maximum of two wires being located on each laminated hook in this case. As a result, both the bridge hooks 13 and the winding hooks 14 can be relatively short. In the first embodiment with the bridges 11 on the armature side 16, the winding hooks 14 of plates L1, L4, L5, L10, L11, L13, L16, L17, L22 and L23 are also bridge hooks 13 which each receive two wires. In this case, all other winding hooks 14 are merely bridge hooks 13 having one wire in each case.

In this example, two windings in each case are wound simultaneously using a double flyer winding device, namely:
w1 and w5
w2 and w6
w3 and w7
w4 and w8

This produces the following wire paths DV1 to DV8 of a winding wire 12:

Wire path DV1 as the start of the wire from L1 (together with the start of the wire of bridge 11 from L1 to L9) via winding w1 as DV2 to plate L10 with two wires under the hook, then further as DV3 to winding w4 and DV4 to plate L11, and then as DV5 to winding w3 and as DV6 to plate L4. The wire path then extends as DV7 to winding w2 and as DV8 as the end of the wire to plate L5. Winding w3 is wound in the opposite direction to windings w1, w2 and w4.

At the same time, wire paths DV1' to DV8' are produced by the double flyer for windings w5 to w8 in a similar manner, as winding wire 12':

Wire path DV1' as the start of the wire from L13 via winding w5 as DV2' to plate L22, then further as DV3' to winding w8 and DV4' to plate L23, and then as DV5' to winding w7 in the opposite winding direction to windings w5, w6 and w8 and as DV6' to plate L16, and further as wire path DV7' to winding w6 and as DV8' as the end of the wire to plate L17.

Although the present invention has been described above with reference to a preferred embodiment, it is not restricted thereto but can be modified as desired without departing from the subject-matter of the present invention.

In particular, it would also be conceivable, for example, for plates other than those shown to be interconnected via corresponding bridges.

The application of the commutator motor according to the invention in a drive device in a motor vehicle, and in this context in particular in an anti-lock braking system of a motor vehicle, should also be taken merely as an example. The invention can in fact be used advantageously in any electric drives.

It would also be conceivable for the windings and the bridge windings to be wound simultaneously, for example if, in the second configuration with an assembled, but not yet wound commutator 6 comprising plates L having two opposing hooks 13 and 14, the bridge windings 11 are wound from the bridge side 15 and the windings 8 are wound from the armature side 16.

Although the numbers given above are preferred numbers and are in some cases derived from a specific application, they can also be varied to a greater or lesser extent in accordance with the activities and knowledge of the person skilled in the art.

LIST OF REFERENCE NUMERALS 1 stator
2, 3 stator pole
4 rotor
5 armature tooth
6 commutator
7 armature shaft
8 winding
9 rotor groove
10 brush
11 bridges
12, 12' winding wire
13 bridge hook
14 winding hook
15 bridge side
16 armature side
DV1 . . . 8, DV1' . . . 8' wire path
L plate
N north pole
S south pole
w1 . . . 8 winding
z1 . . . VIII tooth

The invention claimed is:

1. A method for producing a rotor of a commutator motor, the commutator motor comprising: a stator which has a plurality of stator poles, the rotor comprising a plurality of armature teeth, which are arranged on the circumference of the rotor with interposed rotor grooves, and a commutator which has a plurality of plates and associated winding hooks, the method comprising the steps of:
  winding bridges of the commutator by connecting winding hooks of the plates of the commutator;
  winding windings of armature teeth, wherein half of the windings are formed from a continuous winding wire in each case; and connecting the respective winding ends to winding hooks of the plates of the commutator.

2. The method of claim 1 wherein the windings are wound after the wound commutator has been assembled.

3. The method of claim 1, wherein the bridges and the windings are wound when the commutator is assembled but not wound.

4. The method of claim 1, wherein the bridges are wound without intermediate cutting in a single, continuous process step and wherein predetermined points of the wire are cut after completion of the bridges.

5. The method of claim 1, wherein the start and end of the wire of a respective winding are connected to different winding hooks.

6. The method of claim 1, wherein the bridges and windings are wound by means of a flyer.

7. The method of claim 6, wherein the windings are wound using a double flyer.

8. The method of claim 1, wherein the windings are single-tooth windings.

9. The method of claim 1, wherein the commutator has bridge hooks and winding hooks, the bridges being wound on a bridge side of the commutator by connecting bridge hooks of the plates of the commutator, and the windings of armature teeth being wound and the respective winding ends being connected to winding hooks of the plates on an armature side of the commutator.

10. A commutator motor, comprising:
- a stator which has a plurality of stator poles,
- a rotor which has a plurality of armature teeth which are arranged on the circumference of the rotor with interposed rotor grooves, a winding being provided on each armature tooth,
- a commutator which comprises a plurality of plates and associated bridge hooks and winding hooks, wherein
  - the windings are connected to winding hooks of the plates on an armature side of the commutator,
  - a number of plates are interconnected in each case by bridges between winding hooks of the plates on the armature side of the commutator,
  - half of the windings are formed from a continuous winding wire in each case and
  - the rotor is produced by winding bridges of the commutator by connecting winding hooks of the plates of the commutator, by winding windings of armature teeth, and by connecting the respective winding ends to winding hooks of the plates of the commutator.

11. The motor of claim 10, wherein at least two plates in each case are interconnected via a bridge.

12. The motor of claim 10, wherein at least two of the windings are wound in the opposite direction to the remaining windings.

13. The motor of claim 10, wherein the stator poles are in the form of permanent magnets.

14. The motor of claim 10, wherein the windings are single-tooth windings.

15. The motor of claim 10, wherein the commutator motor is a direct current commutator motor.

16. Anti-lock braking device of a motor vehicle comprising:
- a commutator motor, the commutator motor comprising:
- a stator which has a plurality of stator poles,
- a rotor which has a plurality of armature teeth which are arranged on the circumference of the rotor with interposed rotor grooves, a winding being provided on each armature tooth,
- a commutator which comprises a plurality of plates and associated bridge hooks and winding hooks, wherein
  - the windings are connected to winding hooks of the plates on an armature side of the commutator,
  - a number of plates are interconnected in each case by bridges between winding hooks of the plates on the armature side of the commutator,
  - half of the windings are formed from a continuous winding wire in each case and
  - the rotor is produced by winding bridges of the commutator by connecting winding hooks of the plates of the commutator, by winding windings of armature teeth, and by connecting the respective winding ends to winding hooks of the plates of the commutator.

17. The device of claim 16, wherein at least two plates in each case are interconnected via a bridge.

18. The device of claim 16, wherein at least two of the windings are wound in the opposite direction to the remaining windings.

19. The device of claim 16, wherein the stator poles are in the form of permanent magnets.

20. The device of claim 16, wherein the windings are single-tooth windings.

* * * * *